United States Patent [19]
Groth et al.

[11] 3,984,033
[45] Oct. 5, 1976

[54] ELECTRIC GUN FOR DISPENSING OF COMESTIBLES

[75] Inventors: Hugh F. Groth; Guilbert M. Hunt, both of Brecksville; John D. Vogel, Northfield; Donald E. Watkins, Parma, all of Ohio

[73] Assignee: Wear-Ever Aluminum, Inc., Chillicothe, Ohio

[22] Filed: Dec. 29, 1975

[21] Appl. No.: 645,239

[52] U.S. Cl. .............................. 222/333; 222/390
[51] Int. Cl.² .......................................... B67D 5/46
[58] Field of Search ........................... 222/333, 390

[56] References Cited
UNITED STATES PATENTS

| | | | |
|---|---|---|---|
| 3,156,387 | 11/1964 | Harwood | 222/390 |
| 3,185,345 | 5/1965 | Hunegs | 222/390 X |
| 3,242,881 | 3/1966 | Schafer | 222/390 X |
| 3,254,806 | 6/1966 | Madsen | 222/390 X |
| 3,339,810 | 9/1967 | Block et al. | 222/390 X |
| R26,180 | 4/1967 | Frenzel et al. | 222/334 X |

*Primary Examiner*—Allen N. Knowles
*Assistant Examiner*—Hadd Land
*Attorney, Agent, or Firm*—Patrick J. Viccaro; John P. Taylor

[57] ABSTRACT

An electric gun is provided for the sanitary extruding of comestibles, such as cookie dough, or the like, having an easily disassembled mechanism. Those portions of the gun which are in contact with the food are removable from the drive mechanism to permit sanitary cleaning as well as ease of filling. Reversibility of portions of the mechanism makes reassembly of the gun uncomplicated.

11 Claims, 4 Drawing Figures

ELECTRIC GUN FOR DISPENSING OF COMESTIBLES

BACKGROUND OF THE INVENTION

This invention relates to the extruding of comestibles from an automated mechanism. More particularly, this invention relates to a hand-operated electrified piston-type dispenser for viscous or pasty comestibles.

The dispensing or extruding of comestibles such as cookie dough, icing, or the like, can involve manual dispensing from a squeezable container or alternately, a manually operated push rod or plunger and cylinder mechanism. Ease of cleaning and sanitation are important considerations for such food product dispensers. The former mechanism, having a throw-away type container, has no sanitation problem. Reuseable squeezable containers and the latter type mechanism, however, must be easily disassembled to permit cleaning of the parts.

The dispensing or extruding of similar materials such as grouting, caulking, adhesives, or sealant products in the building industry, as well as other semi-fluid or paste-like materials, such as shaving cream, toothpaste, or the like, using mechanisms wherein a non-rotatable piston is urged by a rotating piston rod to travel in a cylinder to dispense such material therefrom is known in the art. For example, Harwood U.S. Pat. No. 3,156,387; Hunegs U.S. Pat. No. 3,185,345; and Block et al U.S. Pat. No. 3,339,810 show manual apparatus wherein a threaded piston rod is manually rotated to force a piston non-rotatably toward one end of a cylinder containing such viscous materials to dispense the materials from a suitable nozzle or the like. In each patent, cooperating means are provided between the inner wall of the cylinder and the outer edge of the piston to prevent rotation of the piston as it travels down the barrel or cylinder of the dispensing apparatus.

It is also known to automate dispensing apparatus by engaging the piston rod to a drive mechanism coupled to a motor. For example, Frenzel et al Reissue U.S. Pat. No. 26,180 shows a mechanism wherein a piston rod having a piston secured to the end thereof is non-rotatably urged as a unit down a barrel to drive out an adhesive or sealant contained in the barrel. Automated comestible dispensing apparatus such as Schafer U.S. Pat. No. 3,242,881 utilizes a gear having a centrally threaded aperture for engaging the threads of a rod having a plunger thereon. Rotation of the gear urges the non-rotating rod and plunger down a barrel by a motor drive mechanism coupled thereto.

There exists a need, however, for an uncomplicated hand-operated automated mechanism for the dispensing of comestibles in a sanitary fashion whereby the parts of the dispensing apparatus contacting the comestibles can be easily disassembled by an ordinary person without any particular mechanical skill thus permitting sanitary cleaning and simple reassembly of at least those portions of the dispensing apparatus. In contrast, piston and piston rod mechanisms, as in the aforesaid Frenzel et al and Schafer patented automated dispensing apparatus, not being easily disassembled, are not satisfactory from the standpoint of sanitation.

SUMMARY OF THE INVENTION

In accordance with the present invention, comestibles are dispensed by an apparatus that is easily disassembled and reassembled to facilitate sanitary cleaning. Generally stated, the invention contemplates a detachable barrel, a removable end cap on the barrel, a housing having a seat for detachably receiving one end of the barrel and a handle portion for gripping the apparatus. Power and gearing means are located in the housing and include an on-off switch. A removable piston is slidably and non-rotatably arranged in the barrel and is urged to travel in the barrel by a removable piston rod externally threaded for engagement with a threaded hole in the piston. The power and gearing means are operably and detachably connected to one end of the piston rod to cause the rod to rotate. The other end of the piston rod is of reduced cross-section to permit the piston to become threadably disengaged from the rod when the piston reaches the end of the barrel. The barrel, piston rod, or piston may each have identical ends or faces to provide reversibility of the parts and further simplify reassembly.

DETAILED DESCRIPTION OF THE PREFERRED EMBODIMENTS OF THE INVENTION

Figure 1:
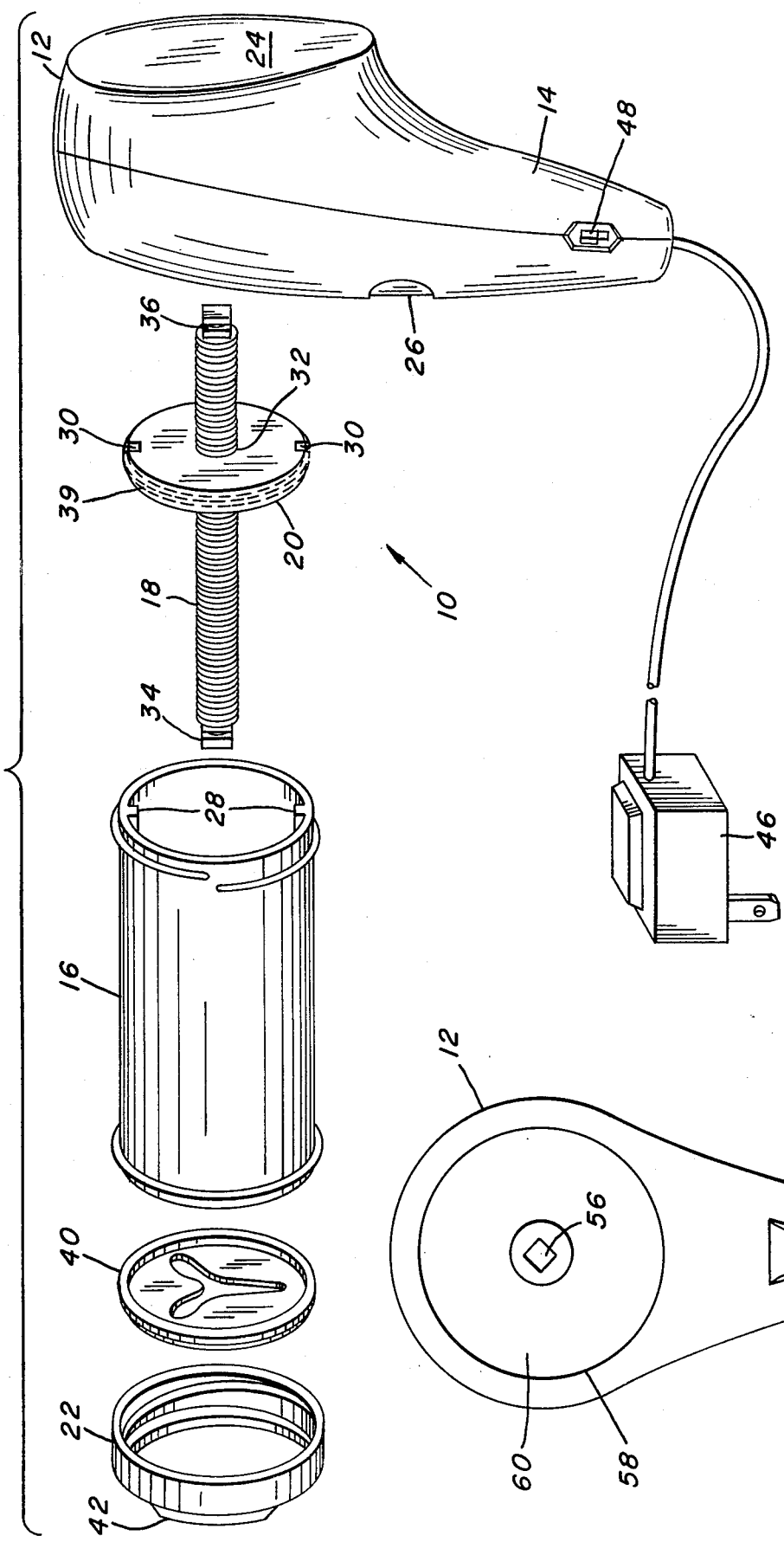
FIG. 1 is an exploded view of the preferred embodiment of the dispensing apparatus of the present invention.

FIG. 1 illustrates an exploded view of a preferred embodiment of the dispensing apparatus 10 of the present invention. The apparatus 10 includes a housing 12 with a handle portion 14, a barrel 16 for attachment in housing 12 and having slidably arranged therein a piston 20. A piston rod 18 is attached to a power and gearing mechanism (not shown) in housing 12 for rotating the piston rod thereby causing the piston 20 to travel in the barrel 16. Comestibles and other viscous material are forced out of the barrel by piston 20 through openings in the barrel end cap 22.

The housing 12 is a substantially enclosed body containing the power and gearing mechanisms, has a seat arrangement for receiving a first end of barrel 16, and has an opening therein for receiving one end of piston rod 18. The housing is ideally suited for dispensing comestibles in that parts are easily detachable from it for cleaning. The housing itself also can be easily wiped and kept sanitarily clean. The housing also includes a planar surface 24 for supporting the apparatus 10 on an external horizontal surface, such as a table or countertop, when filling the barrel with a comestible such as cookie dough, cheese spread or other variety. It should be noted here that the apparatus can be adapted for use with comestibles of lighter or heavier viscosities, such as icing, noodle dough or peanut butter or the like. The housing also has a trigger switch 26 for activating the power means.

In the preferred embodiment illustrated, barrel 16 is a tubular structure having both ends open, and means on a frst end for detachably mounting in housing 12. Preferably, the detachable means on the barrel comprises threads for engagement with a threaded seat in housing 12. In a preferred embodiment, both ends of the barrel 16 are identically shaped so that either end of the barrel can be attached to housing 12 and is, thus, reversible. Means are provided in barrel 16 for cooperation with corresponding means on piston 20 to prevent rotation of the piston as it slides in barrel 16. Such means for preventing rotation can comprise either a longitudinally extending rib or notch on the interior surface of the barrel for engagement with a corresponding notch or rib in piston 20 to prevent rotation of the piston. In the preferred embodiment illustrated in the drawings, barrel 16 has two longitudinal ribs 28 extending the length of the barrel. The use of two ribs 28, diametrically opposite, adds stability to the travel of the piston in the barrel to limit movement transverse to the axis of barrel 16.

Figure 2:
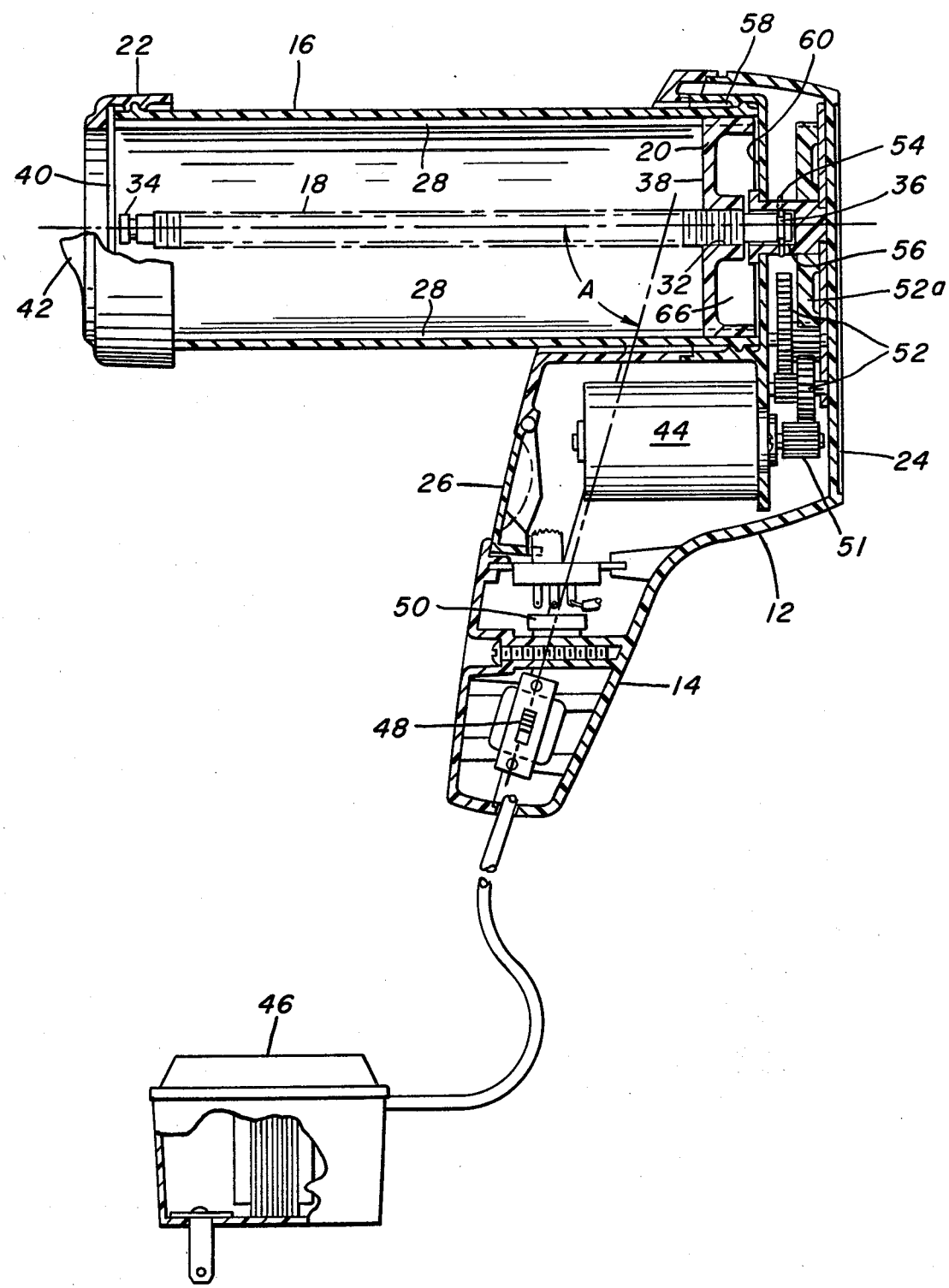
FIG. 2 is a partial cross section of a preferred embodiment of the invention.

Piston 20 is configured as a circular disc having a threaded hole 32 therethrough, preferably, at the geometric center of piston 20. The size of the piston is such as to be in a close tolerance fit with the interior surface of barrel 16. On the peripheral surface of piston 20 is a rib or notch parallel to the axis of the piston for preventing rotation of the piston as it slides in the barrel. In the preferred embodiment illustrated in the drawing, piston 20 has two notches 30 for engagement with the two ribs 28 of barrel 16. It is also to be noted that piston 20 may have identical piston faces 38 to enable the piston to be reversible, i.e. either face of the piston can be substantially planar for contacting and pushing the comestibles out a second end of barrel 16. One face may be non-planar, having cavities 66 therein for structural strength as shown in FIG. 2. As an alternative embodiment, piston 20 may be provided with a wiper member 39 (shown in dotted lines in FIG. 1) projecting radially outward from the peripheral surface of the piston. Wiper 39 is thinner than piston 20 and can extend substantially around the entire periphery of piston 20 with discontinuities at the rib or notch 30 on the piston.

While the preferred embodiment illustrated and described herein comprises a tubular cylinder or barrel with a circular piston therein, it should be understood that noncircular means such as a rectangular parallelopiped barrel with a corresponding rectangular piston therein could be used thereby eliminating the need for the ribs and notches. However, since the attachment means are preferably threaded and a tubular barrel is more easily cleaned, the illustrated embodiment is preferred.

Piston rod 18 is an externally threaded rod for engagement with the threaded hole 32 of piston 20. AT least one end of piston rod 18 is of reduced cross section to enable the piston 20 to become disengaged from rod 18 after piston 20 has traveled to a second end of barrel 16. The opposite end, a first end, of rod 18 is non-circular, and preferably square in cross section, as shown in FIG. 1. This end of rod 18 detachably engages a mating socket in the gearing means in housing 12 as will be described below. Preferably, both ends of rod 18 are identical and of reduced cross section. With both ends identical, piston rod 18 is reversible in that either end can be operably engaged in the gearing means located in housing 12.

Barrel end cap 22 is attached to the second end of barrel 16, i.e. the end not attached to housing 12. Barrel end cap 22 has an opening therethrough to permit the viscous comestible material to be forced out of barrel 16. Preferably, end cap 22 is a ring-type cap having a large opening therein to permit changeable dies or templates 40 having various opening configurations to be attached to the second end of barrel 16 by end cap 22. Preferably, end cap 22 is threadably attached to barrel 16. End cap 22 also includes spacer lugs 42, as is typical of some dispensers of comestibles, for spacing the end of the dispensing apparatus 10 from a cookie sheet or the like to permit the desired amount of viscous comestible material to be dispensed.

Figure 3:
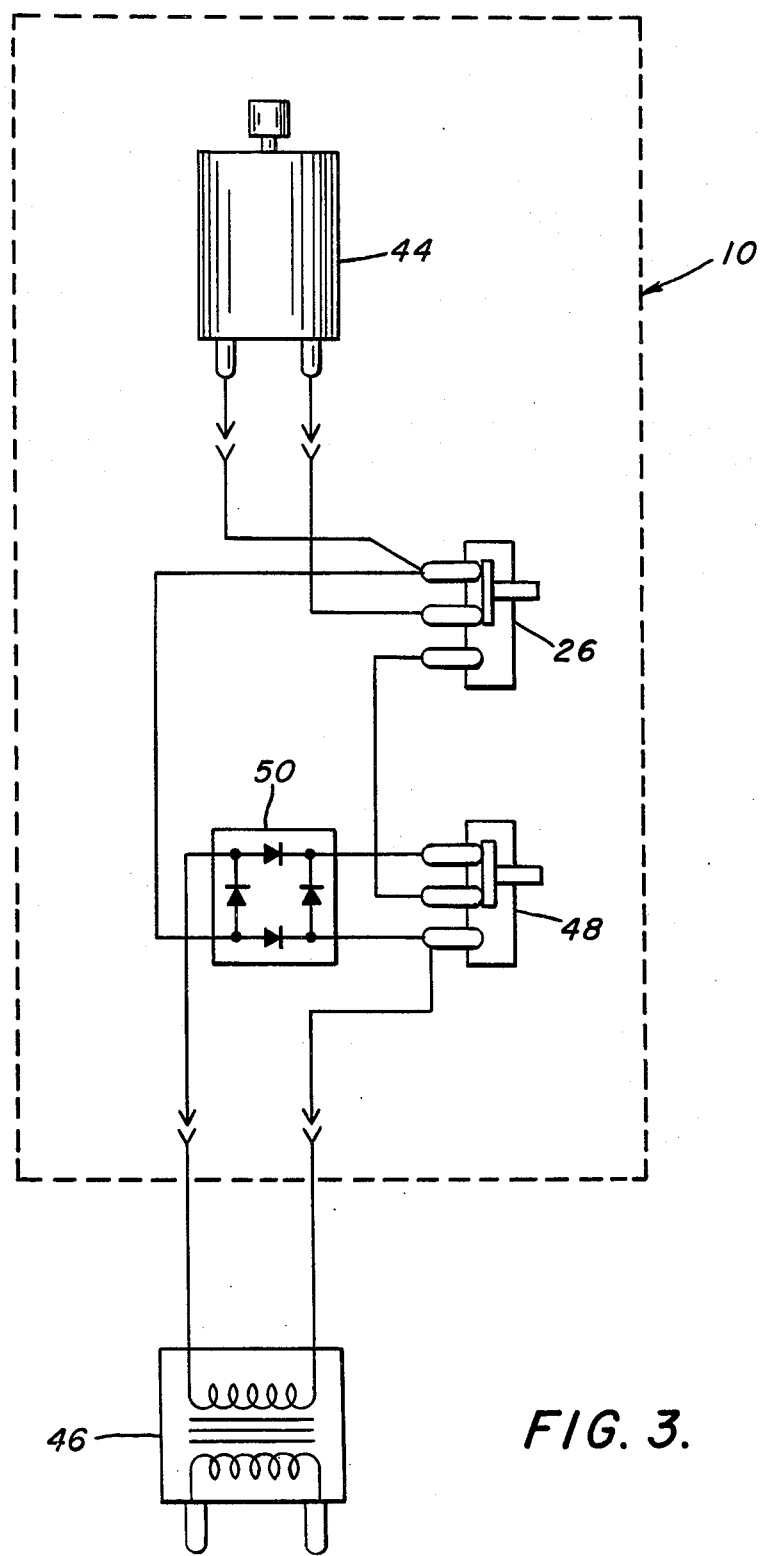
FIG. 3 is a schematic of an electrical circuit of the present invention.

FIG. 2 is a cross section of a preferred embodiment of the dispensing apparatus of the present invention. The power and gearing means is illustrated in the cross section of housing 12. Power means includes a transformer 46 for converting a high voltage, approximately 120 volts, to a lower voltage, for example, approximately 15 volts, for operation of the dispensing apparatus as is shown schematically in FIG. 3. Preferably, the transformer is of a wall plug-in type which is electrically attached to the apparatus via an electrical cord. The electrical cord can be permanently attached in housing 12 or it can be removable with a conventional male-female electrical plug-socket arrangement in handle portion 14 of housing 12. A typical voltage regulation or speed control switch 48 permits the apparatus to operate at either full wave or half wave rectification to control the speed/torque relationship of motor 44. Alternatively, a fully-controlled speed switch, such as a rheostat or the like could be used to control the speed of the motor. The trigger switch 26 is of the momentary-type such that the switch will be momentarily on when depressed and will be off in the normal position. Diode bridge 50 will convert alternating current to direct current, respectively, to feed half wave or full wave direct current to direct current (D.C.) motor 44 depending on the position of the switch 48. Alternatively, a universal (A.C.-D.C.) motor can be used wherein full output power would be obtained by connecting the motor directly to the 15 V.A.C. while lower speed operation would be obtained by connecting a single diode in series with the 15 V.A.C. source, thereby producing half-wave rectified D.C. input to the motor.

A drive pinion 51 on the shaft of D.C. motor 44 operates a conventional reduction gear train 52. The gear train 52 imparts rotation to piston rod 18 resulting in the movement of piston 20 in barrel 16. A first end of rod 18 is detachably fitted in a mating socket 56 which is nonrotatably press-fit into gear 52a of gear train 52 to impart rotation to the piston rod 18. Piston rod 18 can be maintained in socket 56 in a variety of ways. Preferably, spring clip 54 engages a notch 36 on the end of the piston rod 18.

Figure 1A:
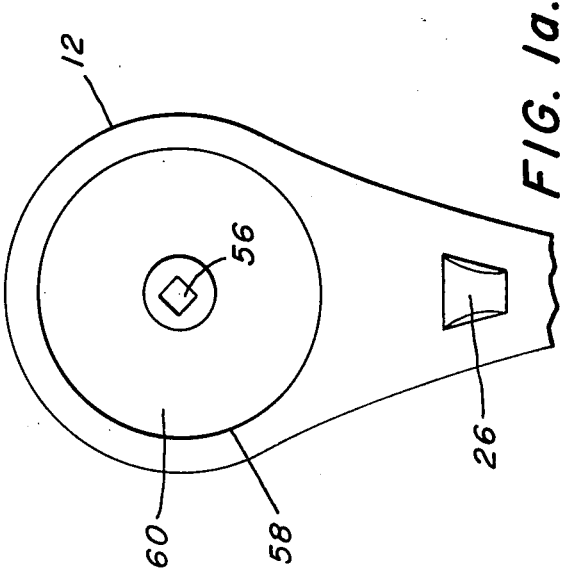
FIG. 1a is another view of the dispensing apparatus of FIG. 1.

FIG. 1a, which is another view of the dispensing apparatus of FIG. 1, illustrates a view of housing 12 showing seat 58 therein having a wall 60 and mating socket 56, into which the first end of rod 18 is detachably fitted. A seat 58 in housing 12 is adapted to receive one end of barrel 16. Preferably, seat 58 has threads thereon for engagement with a threaded first end of barrel 16. It is within the scope of the invention, however, that barrel 16 can be detachably mounted in seat 58 in other ways.

FIG. 2 further illustrates piston 20 threadably engaged on piston rod 18 and slidably arranged in barrel 16. Piston 20 is shown adjacent to wall 60 of seat 58 in housing 12. In this position, the largest volume of viscous material or comestibles could be placed in barrel 16. Piston rod 18 passes through concentric threaded hole 32 in the piston 20. Rotation of rod 18 causes piston 20 to travel along rod 18 and in barrel 16. Ribs 28 of barrel 16 and notches 30 (as shown in FIG. 1) of piston 20 cooperate to prevent rotation of piston 20 as it moves in barrel 16.

The parts of the dispensing apparatus 10 can be made of various material compositions. Consistent with an objective of the invention to provide a sanitary dispenser that is easily cleaned, the housing 12 and most of the removable parts are of plastic material capable of withstanding temperatures normally encountered in dishwashing equipment in the home. Preferably, the housing is composed of acrylonitrile-butydiene-styrene or other high-impact plastic material. The gear train 52 in housing 12 may be made of a nylon or other equivalent plastic material to reduce the weight of apparatus 10. Barrel 16 is preferably composed of a translucent or transparent sanitary thermoplastic, such as a styrene-acrylonitrile or a polypropylene material so that the amount of comestibles in the barrel is visible. The end cap 22 and piston 20 are preferably made of a nylon material and piston rod 18 is preferably composed of an ethyl cellulose or acetile plastic.

The use and operation of the dispensing apparatus can be more completely understood by beginning with barrel 16, piston rod 18 and piston 20 detached from their positions in housing 12 as shown in exploded view of FIG. 1. Either the first end of piston rod 18 or the first end of barrel 16 can be attached to housing 12 to commence assembly of apparatus 10. Preferably, the first end of barrel 16 is threadably engaged in housing 12 prior to the attachment of piston rod 18. Piston rod 18 and piston 20 screwed thereon are placed in position through the open second end of barrel 16 and first end of rod 18 is fitted into socket 56. Comestible materials are then placed in the open end of barrel 16 and forced down or in the barrel until they contact surface 38 of piston 20. During the filling operation, that is, when the comestibles are being placed in the open end of barrel 16, the planar surface 24 of housing 12 can be placed on an external horizontal surface such as a tabletop or countertop to support apparatus 10 to enable the barrel to be standing upright with its open second end facing the user of the apparatus to enable one to easily place the food product into the barrel. After a desired amount of comestible material is placed in barrel 16, template 40 having the desired opening configuration (or another appropriate tip or attachment) is placed on the second end of barrel 16 and secured thereon by barrel end cap 22.

To commence the dispensing operation, the power means must be connected to an electrical source. Plug-in transformer 46 is plugged in to a conventional household outlet. Voltage regulation switch 48 is set to control the speed of the motor depending on the viscosity of the comestible material to be dispensed. Depression of the trigger switch 26 will activate the motor causing the gearing means 52 to rotate socket 56 which rotates piston rod 18. Piston 20 non-rotatably slides in barrel 16 forcing the comestibles out of template 40 in barrel end cap 22. When piston 20 reaches end 34 of piston rod 18, it will become threadably disengaged but will remain on the piston rod and inside end cap 22. Such a feature avoids exerting pressure on the barrel end cap as the piston rod 20 continues to rotate. It further avoids any possible damage to the motor and gearing means.

For dispensing or extruding, the apparatus 10 is gripped by handle portion 14 of housing 12 and barrel 16 placed adjacent a cookie sheet or the like and spaced therefrom by spacer lugs 42 on barrel end cap 22. Such spacing provides a desired amount of comestibles to be dispensed. It should be noted that another feature of dispensing apparatus 10 is the angle, denoted in FIG. 2 as A, formed between the center lines of handle portion 14 of housing 12 and the center line of barrel 16. Preferably, angle A is less than 90°. Such as arrangement, during the dispensing operation where barrel end cap 22 will be adjacent a cookie sheet, will permit the user to grasp the gun in a more convenient and comfortable manner.

To place more comestible material in barrel 16, barrel end cap 22 can be removed and piston 20 can be easily removed from barrel 16 as piston 20 is threadably disengaged from rod 18, and is loosely contacting the second end 34 of rod 18. The second end 34 of rod 18 is grasped with a pulling force to disengage it from socket 56. First end of rod 18 can then be screwed into hole 32 of piston 20 from the thrusting face 38 side, as described above. Then, the first end of rod 18 can be attached in support 54. Alternately, if rod 18 and piston 20 are both reversible, i.e. piston 20 has two thrusting faces 38, then the second end 34 or rod 18 can be screwed into hole 32 of piston 20. Rod 18 can be detached from support 54 and the second end 34, identical to the first end, can be attached to support 54. To disassemble apparatus 10, barrel 16 can be threadably disengaged from seat 58 and piston rod 18 can be disconnected from its support 54 for cleaning the removable parts. The parts can be reassembled as described above for another dispensing operation.

As is the objective of the invention, the dispensing apparatus thus provides an uncomplicated automated apparatus for dispensing comestibles wherein those portions of the apparatus which are in contact with the comestibles can be disassembled and reassembled by one having little mechanical skill to permit sanitary cleaning.

Having thus described the invention, what is claimed is:

1. An apparatus for dispensing comestibles comprising:
   a. a detachable barrel;
   b. a housing having a seat for detachably receiving a first end of said barrel and a handle portion for gripping said apparatus;
   c. power means and gearing means adjacent the handle portion of said housing;
   d. means for activating said power and gearing means;
   e. a removable piston slidably arranged in said barrel and having thereon means for preventing rotation of said piston within said barrel, said piston including a concentric threaded hole therethrough;
   f. means on said barrel for preventing rotation of said piston in cooperation with said means on said piston;
   g. a removable piston rod externally threaded for engagement with the threaded hole of said piston, said rod including at least one end of reduced cross section, a first end in operable engagement with said power means and gear means of said housing to impart rotation to said piston rod to cause said piston to slide in said barrel, and a second end of reduced cross section which permits said piston to become threadably disengaged from said rod when the piston reaches a second end of said barrel; and h. a barrel end cap attached to the second end of said barrel and having an opening therein whereby said comestible is forced through said opening when said power and gearing means are activated to rotate said piston rod and to urge said piston to travel non-rotatably toward said barrel end cap.

2. The apparatus as set forth in claim 1 wherein said barrel is composed of translucent material, the first and second ends of said barrel are open and identical, with each end of said barrel having a fastening means for detachably mounting either of said ends of said barrel into the seat of said housing.

3. The apparatus as set forth in claim 1 further includes dies having various opening configurations through which the comestibles are dispensed and wherein said barrel end cap is fitted to interchangeably receive said dies therein.

4. The apparatus as set forth in claim 1 wherein said piston rod is externally threaded to a location adjacent the ends of said rod and both ends of said rod are identically shaped non-circular in cross section and threadless for operably attaching either end of said rod with said power means and gear means.

5. The apparatus as set forth in claim 1 wherein said piston has two faces, either of which contacts the comestible, thus permitting reversible use of the piston.

6. The apparatus as set forth in claim 1 wherein said means for preventing rotation of said piston within said barrel as said piston travels in said barrel is the sliding cooperation of non-circular means.

7. The apparatus as set forth in claim 6 wherein said non-circular means includes at least one longitudinal rib in said barrel extending substantially the length of said barrel and substantially parallel to the axis of said barrel, and wherein said piston includes a peripheral surface having at least one notch thereon for cooperating with said rib of said barrel for non-rotatable sliding movement of said piston within said barrel.

8. The apparatus as set forth in claim 1 wherein the longitudinal axis of said handle portion of said housing and the axis of said barrel form an included angle of less than 90° to permit the user to grasp said apparatus in a more convenient and comfortable manner.

9. The apparatus as set forth in claim 1 wherein said housing includes a planar surface thereon for supporting said apparatus on an external surface while placing the viscous material in the second end of said barrel, the second end of said barrel being upwardly directed.

10. The apparatus as set forth in claim 1 wherein said activating means includes a switch in said handle portion and said power means includes a direct current motor, a transformer for reducing voltage to approximately 15 volts and a diode bridge for converting alternating current to direct current, said power means being a constant power source allowing a variation in speed of the motor due to varying viscosities of material to be dispensed.

11. An apparatus for dispensing viscous material comprising:
 a. a reversible, detachable barrel composed of translucent material having two longitudinal ribs, diametrically opposed on the interior surface of said barrel, the first and second ends of said barrel being open and identically threaded;
 b. a housing having a means for threadably receiving a first end of said barrel and having a handle portion and planar surface thereon for supporting said apparatus when placed on an external surface with a second end of said barrel elevated higher than the first end of said barrel and wherein the longitudinal axis of the handle portion of said housing and the axis of said barrel form an included angle of less than 90°;
 c. a removable, non-rotatable piston slidably mounted in said barrel, said piston having a threaded hole therethrough at its geometric center, the axis of said hole being substantially parallel with the axis of said barrel, the peripheral surface on said piston having two diametrically opposed notches for cooperation with said ribs of said barrel;
 d. power means and gearing means in said housing;
 e. switch means in the handle portion of said housing for activating said power and gearing means;
 f. a reversible, removable piston rod externally threaded, except adjacent the ends thereof, for engagement with the threaded hole of said piston, both ends of said rod of identically reduced non-circular cross section and threadless for operably connecting either end of said rod with said power means and gear means for rotation of said piston rod to axially move said piston in said barrel, the threadless portion of second end of said rod located near the second end of said barrel thus permitting said piston to become threadably disengaged from said rod to prevent further axial movement of said piston; and
 g. a barrel end cap having an opening therein threadably attached to the second end of said barrel and dies for providing various opening configurations through which viscous material in said barrel is forced, said barrel end cap being fitted to interchangeably receive said dies.

* * * * *